(12) United States Patent
Ling et al.

(10) Patent No.: US 10,873,250 B2
(45) Date of Patent: Dec. 22, 2020

(54) LINEAR VIBRATION MOTOR

(71) Applicant: AAC Technologies Pte. Ltd., Singapore (SG)

(72) Inventors: Fanghua Ling, Shenzhen (CN); Xiaofeng Pu, Shenzhen (CN); Tao Zhang, Shenzhen (CN); Jinquan Huang, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 0 days.

(21) Appl. No.: 16/233,256

(22) Filed: Dec. 27, 2018

(65) Prior Publication Data

US 2019/0252962 A1    Aug. 15, 2019

(30) Foreign Application Priority Data

Feb. 11, 2018  (CN) .................... 2018 2 0254197 U

(51) Int. Cl.
*H02K 33/14* (2006.01)
*B06B 1/04* (2006.01)
*H02K 35/02* (2006.01)

(52) U.S. Cl.
CPC ............ *H02K 33/14* (2013.01); *B06B 1/045* (2013.01); *H02K 35/02* (2013.01)

(58) Field of Classification Search
CPC ......... B06B 1/045; H02K 33/14; H02K 35/02
USPC ......................................................... 310/15
See application file for complete search history.

(56) References Cited

U.S. PATENT DOCUMENTS

| | | | | |
|---|---|---|---|---|
| 6,008,561 | A * | 12/1999 | Tang .................... | H02K 19/103 |
| | | | | 310/180 |
| 2012/0169148 | A1* | 7/2012 | Kim ....................... | H02K 33/16 |
| | | | | 310/25 |
| 2015/0155761 | A1* | 6/2015 | Richard ................. | H02K 11/33 |
| | | | | 310/68 D |
| 2016/0013710 | A1* | 1/2016 | Dong ..................... | H02K 33/16 |
| | | | | 310/25 |
| 2017/0012518 | A1* | 1/2017 | Wang ..................... | H02K 33/16 |
| 2017/0033651 | A1* | 2/2017 | Mao ....................... | H02K 33/16 |
| 2017/0070132 | A1* | 3/2017 | Wang ..................... | H02K 33/16 |
| 2017/0110947 | A1* | 4/2017 | Mao ......................... | H02K 5/04 |
| 2017/0117790 | A1* | 4/2017 | Mao ......................... | H02K 1/34 |
| 2017/0117791 | A1* | 4/2017 | Mao ......................... | H02K 1/34 |
| 2017/0117793 | A1* | 4/2017 | Mao ......................... | H02K 99/20 |
| 2017/0120297 | A1* | 5/2017 | Chun .................... | H02K 33/16 |
| 2017/0120298 | A1* | 5/2017 | Mao ....................... | B06B 1/045 |
| 2017/0144191 | A1* | 5/2017 | Mao ....................... | B06B 1/045 |
| 2017/0179804 | A1* | 6/2017 | Xu ......................... | H02K 33/16 |
| 2017/0222532 | A1* | 8/2017 | Wang ..................... | H02K 33/16 |

(Continued)

*Primary Examiner* — Alex W Mok
(74) *Attorney, Agent, or Firm* — IPro, PLLC; Na Xu

(57) ABSTRACT

The present disclosure provides a linear vibration motor, including a base having a receiving space, a vibration unit located in the receiving space, an elastic member fixed to the base and suspending the vibration unit in the receiving space, and a coil fixed to the base and opposite to and spaced away from the vibration unit. The vibration unit includes a magnet, the magnet is opposite to and spaced away from the coil, the coil includes a first coil for connecting an electric signal and a second coil insulated from the first coil, and both ends of the second coil are connected to each other to form a closed loop. Compared with the related art, the linear vibration motor in the present disclosure has high reliability.

4 Claims, 3 Drawing Sheets

(56) References Cited

U.S. PATENT DOCUMENTS

2017/0288521 A1* 10/2017 Jin .................. H02K 33/02
2017/0288524 A1* 10/2017 Jin .................. H02K 5/225
2017/0341108 A1* 11/2017 Mao ................. B06B 1/045
2017/0366077 A1* 12/2017 Oonishi ............ H02K 11/046

* cited by examiner

LINEAR VIBRATION MOTOR

CROSS-REFERENCE TO RELATED APPLICATIONS

This application claims the priority benefit of Chinese Patent Applications Ser. No. 201820254197.5 filed on Feb. 11, 2018, the entire content of which is incorporated herein by reference.

TECHNICAL FIELD

The present disclosure relates to a motor, and more particularly to a linear vibration motor applied to a mobile electronic product.

BACKGROUND

With the development of an electronic technology, portable consumer electronics are increasingly sought after by people. Electronics such as mobile phones, handheld game consoles, navigation devices or handheld multimedia entertainment devices generally use linear vibration motors to perform system feedback, such as call reminders, message reminders and navigation reminders of mobile phones, and vibration feedback of game consoles. Such a wide range of application requires excellent performance and long service life of a vibration motor.

A linear vibration motor in the related art includes a base having a receiving space, a vibration unit located in the receiving space and having a magnet, an elastic member fixing and suspending the vibration unit in the receiving space, and a coil fixed to the base. By means of an interaction between a magnetic field generated by the coil and a magnetic field generated by the vibration unit, the vibration unit is driven to perform a reciprocating linear motion to generate vibration.

However, the linear vibration motor in the related art adjusts damping of the vibration unit by adding a damping material such as a magnetic fluid or a damping foam. However, the temperature characteristics of the magnetic fluid or the damping foam are poor. At high temperature, high humidity or low temperature, the damping material is easy to fail and the damping cannot be adjusted, resulting in failure of the linear vibration motor and poor reliability.

Therefore, there is a need to provide a novel linear vibration motor to resolve the foregoing problems.

DETAILED DESCRIPTION

The present disclosure will be further described below with reference to the accompanying drawings and embodiments.

Figure 1:
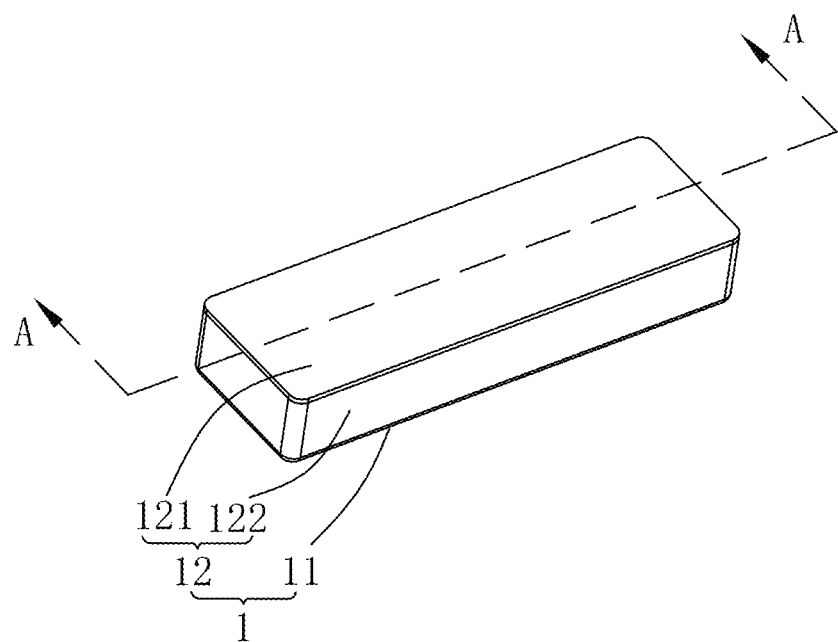
FIG. 1 is a three-dimensional structural of a linear vibration motor according to the present disclosure.
Figure 2:
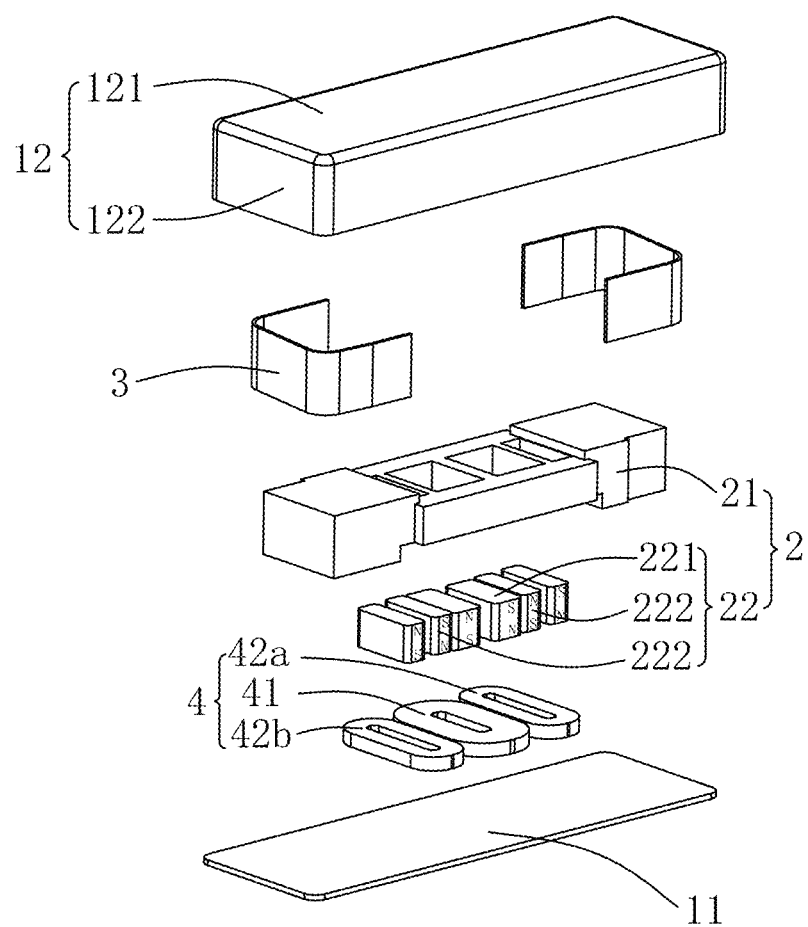
FIG. 2 is a three-dimensional structural exploded view of a linear vibration motor according to the present disclosure.
Figure 3:
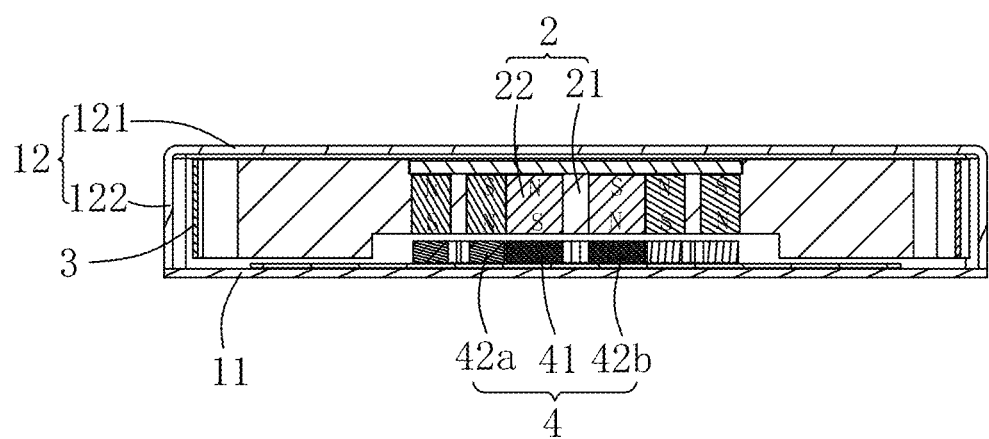
FIG. 3 is a section view along a line A-A of FIG. 1.

With reference to FIG. 1 to FIG. 3 together, where FIG. 1 is a three-dimensional structural of a linear vibration motor according to the present disclosure; FIG. 2 is a three-dimensional structural exploded view of a linear vibration motor according to the present disclosure; FIG. 3 is a section view along a line A-A of FIG. 1. The present disclosure provides a linear vibration motor 100, including a base 1 having a receiving space 10, a vibration unit 2 located in the receiving space 10, an elastic member 3 fixed to the base 1 and suspending the vibration unit 2 in the receiving space 10, and a coil 4 fixed to the base 1 and opposite to the vibration unit 2.

The base 1 includes a bottom plate 11 and an upper cover 12 covering the bottom plate 11, which jointly define the receiving space 10.

The upper cover 12 includes a top plate 121 opposite to the bottom plate 11 and a side plate 122 extending toward the bottom plate 11 from the top plate 121 in a bending manner. In this embodiment, the base 1 is rectangular solid. Therefore, the side plate 122 includes four sides.

The vibration unit 2 includes a weight 21 and a magnet 22 embedded into the weight 21.

The weight 21 is used for increasing the weight of the vibration unit 2 to improve the vibration amplitude and improve the vibration effect of the linear vibration motor 100.

The magnet 22 is used for generating a magnetic field and is opposite to and spaced away from the coil 4 and cooperates therewith to form an electromagnetic field. It should be noted that the magnet 22 may be a magnet structure or may be a plurality of magnet structures, whichever is feasible. The magnet 22 and the coil 4 are opposite to each other, and it is not limited that they face each other directly, as long as at least a part of the magnet 22 can directly face the coil 4 during vibration.

In this embodiment, the magnet 22 includes a main magnet 221 and at least two secondary magnets 222 disposed on two opposite sides of the main magnet 221 in a vibration direction of the vibration unit 2 respectively.

There are two elastic members 3 located on two opposite sides of the weight 21 respectively. The elastic members 3 are fixed to the weight 21, so as to suspend the vibration unit 2 in the receiving space 10. The arrangement of a double-elastic member structure enables the linear vibration motor 100 to be more balanced in vibration effect and better in reliability.

The coil 4 is fixed to the base 1 and is opposite to and spaced away from the vibration unit 2. Specifically, the coil 4 is fixedly mounted on the bottom plate 11, and directly faces and is spaced away from the magnet 22. A magnetic field formed after the coil 4 is energized interacts with a magnetic field of the magnet 22, so as to drive the vibration unit 2 to reciprocate linearly to generate a vibration effect. Herein, the scenario where they directly face and are spaced away from each other is effective as long as at least a part of the magnet 22 can directly face the coil 4 during vibration, so that the phenomenon that a conductor cuts a magnetic line can be generated to satisfy the Lenz's law.

Specifically, the coil 4 includes a first coil 41 for connecting an electric signal and a second coil 42 insulated from the first coil 41.

There may be one or more second coils 42, whichever is feasible.

When there is one second coil 42, it may be fixedly mounted on the bottom plate 11 and located on the circumferential side of the first coil 41; or the second coil 42 may be fixedly mounted on the top plate 121 and opposite to the first coil 41.

The second coil 42 may be provided with a separate magnetic circuit driving structure fixed to a mass block 3. Of course, the magnet 22 may be shared as a driving structure, or the magnet 22 may be shared and a driving magnet may be added as a drive, whichever is feasible.

In this embodiment, the principle is described by using an example in which there are two second coils. A second ring coil 42a disposed on one side of the first coil 41 and a third ring coil 42b disposed on one the other side of the first coil 41. And both the second ring coil 42a and the third ring coil 42b are insulated from the first coil 41. And the first coil 41, the second ring coil 42a and the third ring coil 42b are all non-coaxially winded. The main magnet 221 directly faces the first coil 41, and the secondary magnets 222 directly face the second ring coil 42a and the third ring coil 42b respectively.

The first coil 42 interacts with the magnet 22 after being energized, so as to drive the vibration unit 2 to vibrate.

Both ends of the second ring coil 42a and the third ring coil 42b are connected to each other to form a closed loop. The the second ring coil 42a and the third ring coil 42b are not energized, that is, not connected to an external electric signal. According to the Lenz's law, when the magnet 22 of the vibration unit 2 reciprocates, the second ring coil 42a and the third ring coil 42b of the closed loop structure generates an induced current, and an induced current magnetic field always hinders a magnetic flux that causes the induced current, that is, hinders the motion of the vibration unit 2, so as to achieve the purpose of damping adjustment of the vibration unit 2. The structure is not affected by external factors such as temperature, so that the linear vibration motor 100 has good reliability.

An induced electromotive force generated by the second coil 42 is E=BLV, B is a magnetic field intensity generated by the magnet 22, L is an effective length of the second coil 42 in a magnetic field, and V is a moving speed of the vibration unit 2.

A damping force of the induced electromotive force on a vibration system including the magnet 22 is:

$$F = BLI = BL\frac{E}{R} = \frac{(BL)^2}{R}V$$

where R is the resistance of the second coil 42.

The second coil 42 is used to form a damping mode, and the temperature stability is good; as the resistance of the second coil 42 is smaller, the induced electromotive force is larger, so that a larger electric damping can be achieved; and as the moving speed of the vibration unit 2 is higher, the generated induced electromotive force is larger, and the damping characteristics is better.

Compared with the related art, the linear vibration motor of the present disclosure sets coils as a first coil and a second coil, which are opposite to a vibration unit respectively. The first coil is connected to an external electric signal to drive the vibration unit to work. Both ends of the second coil are connected to each other to form a closed loop without access of an electric signal. According to the principle of the Lenz's law, when a magnet of the vibration unit reciprocates, the second coil of the closed loop structure generates an induced current, and an induced current magnetic field always hinders a magnetic flux that causes the induced current, that is, hinders the motion of the vibration unit, so as to achieve the purpose of damping adjustment of the vibration unit. The structure is not affected by external factors such as temperature, so that the linear vibration motor has good reliability.

The above descriptions are only embodiments of the present disclosure, and thus do not limit the scope of the patent of the present disclosure. Any equivalent structures or equivalent flow transformations made by using the specification and the drawings of the present disclosure or directly or indirectly applied to other related technical fields are all included in the scope of patent protection of the present disclosure.

What is claimed is:

1. A linear vibration motor, comprising:
a base having a receiving space,
a vibration unit located in the receiving space,
an elastic member fixed to the base and suspending the vibration unit in the receiving space, and coils fixed to the base and opposite to and spaced away from the vibration unit;
wherein the vibration unit comprises a magnet, the magnet is opposite to and spaced away from the coils;
wherein the coils comprise:
a first coil for connecting an electric signal and
a second ring coil disposed on one side of the first coil;
a third ring coil disposed on the other side of the first coil;
and both the second ring coil and the third ring coil are insulated from the first coil; the first coil, the second ring coil and the third ring coil are all non-coaxially winded;
both ends the second ring coil and the third ring coil are connected to each other to form a closed loop and the second ring coil and the third ring coil are not connected to an external electric signal;
when the magnet of the vibration unit reciprocates, the second ring coil and the third ring coil generate an induced current which hinders the motion of the vibration unit.

2. The linear vibration motor according to claim 1, wherein the magnet comprises a main magnet and at least two secondary magnets disposed on two opposite sides of the main magnet in a vibration direction of the vibration unit respectively, the main magnet directly faces the first coil, and the secondary magnets directly face the second ring coil and the third ring coil respectively.

3. The linear vibration motor according to claim 1, wherein the vibration unit further comprises a weight, the magnet is embedded and fixed to the weight, and the elastic member is fixedly connected to the weight.

4. The linear vibration motor according to claim 3, wherein there are two elastic members disposed on two opposite sides of the weight respectively.

* * * * *